(12) United States Patent
Palomaki (10) Patent No.: US 8,918,888 B2
(45) Date of Patent: Dec. 23, 2014

(54) AGENT BASED APPLICATION REPUTATION SYSTEM FOR OPERATING SYSTEMS

(71) Applicant: F-Secure Corporation, Helsinki (FI)

(72) Inventor: Pirkka Palomaki, Saratoga, CA (US)

(73) Assignee: F-Secure Corporation, Helsinki (FI)

(*) Notice: Subject to any disclaimer, the term of this patent is extended or adjusted under 35 U.S.C. 154(b) by 0 days.

(21) Appl. No.: 14/156,887

(22) Filed: Jan. 16, 2014

(65) Prior Publication Data

US 2014/0208425 A1 Jul. 24, 2014

(30) Foreign Application Priority Data

Jan. 21, 2013 (GB) .................................. 1301016.0

(51) Int. Cl.
*G06F 21/00* (2013.01)
*G06F 21/56* (2013.01)
*G06F 21/57* (2013.01)

(52) U.S. Cl.
CPC .............. *G06F 21/56* (2013.01); *G06F 21/577* (2013.01); *G06F 21/565* (2013.01); *G06F 21/567* (2013.01)
USPC .......................................................... 726/25

(58) Field of Classification Search
CPC .................................................. G06F 21/577
USPC ....................................................... 726/23, 25
See application file for complete search history.

(56) References Cited

U.S. PATENT DOCUMENTS

| 5,999,740 A | * | 12/1999 | Rowley | 717/173 |
| 7,475,125 B2 | * | 1/2009 | Brockway et al. | 709/219 |
| 2009/0254993 A1 | | 10/2009 | Leone | 726/25 |
| 2013/0117846 A1 | * | 5/2013 | Mahaffey et al. | 726/22 |
| 2014/0059691 A1 | * | 2/2014 | Wang et al. | 726/25 |
| 2014/0201843 A1 | * | 7/2014 | Hibbert et al. | 726/25 |

FOREIGN PATENT DOCUMENTS

WO WO-2012/027588 A1 3/2012

* cited by examiner

*Primary Examiner* — Kaveh Abrishamkar
*Assistant Examiner* — Ngoc D Nguyen
(74) *Attorney, Agent, or Firm* — Harrington & Smith (57) ABSTRACT

A method for implementing a security agent on behalf of a device, the method comprising: obtaining a list of applications installed on the device from a remote repository; for each respective application on the list, comparing reputation attributes obtained from a reputation database against attributes of the application installed on the device; and for any of the respective applications for which it is determined from the comparing that the application installed on the device is malicious, taking action to limit malicious activity by the respective application installed on the device.

16 Claims, 7 Drawing Sheets

AGENT BASED APPLICATION REPUTATION SYSTEM FOR OPERATING SYSTEMS

TECHNICAL FIELD

The invention relates to computer security, and more specifically to providing malware detection and removal for operating systems (e.g., mobile operating systems) that support application installation through a remote virtual application store or social networking site, without a need to install security software directly on such operating system.

BACKGROUND

Conventional anti-virus programs running on a conventional personal computer (PC)-type operating system (OS) generally run in the background and see all of the processes running and programs installed on the PC. Computer operating systems for mobile devices are unlike PC-type operating systems in that mobile operating systems, such as for example the APPLE iOS and the mobile OS for smartphones running WINDOWS 8, are much more closed or 'sandboxed'. For this reason a conventional PC-type anti-virus program will not be very effective for a mobile OS. It is the more limited nature of the mobile OSs rather than the fact that it is installed on a portable device, and so sometimes mobile OSs are referred to as restricted Oss. What is needed in the art is anti-virus functionality for smartphones and other computing devices running a restricted OS, by implementing systems and methods that do not require installing anti-virus software on the device itself. Optionally the system may have a light application on the restricted OS to display system actions, or it may use existing communication channels, such as SMS messages to communicate with the user. Even though the benefits are clearer in restricted OSs, the same system and methods are applicable also for open, PC-type operating systems, in case software installation is performed through a remote virtual application store or virtual social networking site.

SUMMARY

In accordance with one exemplary aspect of these teachings there is a method for implementing a security agent on behalf of a device that is not installed on that device. In this aspect the method comprises: obtaining a list of applications installed on the device from a centralized repository, for example an application store rather than from the device itself; for each respective application on the list, comparing reputation attributes obtained from a reputation database against attributes of the application installed on the device; and for any of the respective applications for which it is determined from the comparing that the application installed on the device is malicious, taking action to limit malicious activity by the respective application installed on the device.

In accordance with another exemplary aspect of these teachings there is a computer readable memory storing a set of executable instructions for implementing a security agent on behalf of a device. In this aspect the set of executable instructions comprises: code for obtaining a list of applications installed on the device from a central repository rather than from the device itself; code for comparing, for each respective application on the list, reputation attributes obtained from a reputation database against attributes of the application installed on the device; and for any of the respective applications for which it is determined from executing the code for comparing that the application installed on the device is malicious, code for taking action to limit malicious activity by the respective application installed on the device.

In accordance with a still further exemplary aspect of these teachings there is at least one security server comprising at least one memory storing a set of computer executable instructions and at least one processor. In this aspect the memory with the set of computer executable instructions is configured with the at least one processor to cause the security server to at least: obtain a list of applications installed on a device from a central repository rather than from the device itself; for each respective application on the list, compare reputation attributes obtained from a reputation database against attributes of the application installed on the device; and for any of the respective applications for which it is determined from the comparing that the application installed on the device is malicious, take action to limit malicious activity by the respective application installed on the device.

These and other aspects are detailed more particularly below.

DETAILED DESCRIPTION

Online portals through which users of devices, such as mobile portable devices or smartphones, can shop among a wide variety of downloadable software are well known and sometimes referred to as application stores or virtual application stores. The software programs available for download by users are generally characterized as being relatively small in size, typically on the order of a few or tens of megabytes, and are widely known as apps. Currently there are only a select few application stores that command a large market share: APPLE's APPSTORE, GOOGLE PLAY and the MICROSOFT WINDOWS STORE and MARKETPLACE are among the more popular sites.

The vast majority of software programs that the typical user installs on his/her device are software applications that users download from these or other such online application stores. Additionally, many of the software programs that are pre-installed in devices, such as smartphones by the device manufacturer, cellular service provider or retailer are also software applications which generally are supported for updating purposes by these online software retailers.

Users keep accounts at the virtual application stores from which they download and so the application stores keep a record for each user of what specific software applications they've downloaded. Even in the less common situation where a user has multiple devices, the application stores can keep different lists per user device so as to efficiently provide software application updates and suggestions based on previous download history on a device-specific basis. For security and privacy purposes each user account is protected with some security credentials such as a password submitted to the application store by the user, so that only the authorized user can see its purchase history, update credit card and address information, and the like.

As with any software stored and/or running in a modern electronic device, there is the potential for malicious code in software applications which can operate for example to send private user information to unauthorized third parties or to disable or slow down other computer programs/code or processes. Sometimes this malware may be in the software application as downloaded by the user, or sometimes it may arise after the initial download from some other source via some 'backdoor' security hole.

The most popular application stores are largely open for third-party developers to publish their own software application for download and this trend seems likely to continue since it offers quite a large variety of applications with fast market responsiveness. But so many publishers of the vastly different applications make it difficult for the operator of the application store to pre-screen every application and every update for malicious code. Even if pre-screening were 100% effective, as noted above the fact that there are so many application publishers mean some will be more prone to infection after being downloaded.

The malware risk in software applications is not a new one, and there exist databases that, for anti-virus purposes, track applications by name, version number, and other information to uniquely identify a given application. Databases such as these are known in the art as reputation databases, because they list for a given computer program, based on previously reported problems with that program, whether it is known to be clean or known to be infected (or subject to infection) by malware.

Some of the more sophisticated reputation databases include for each program a list of attributes. For example, one attribute may be how much battery power the application draws when running, another may be an amount of resources (e.g., how much memory and processing power) the running application accesses on its host device. These historical attributes can be used to assess whether a specific instance of a given program, installed on a specific computing device, is exhibiting behavior that is suspect or is within the norm of how uninfected versions of that same program have been reported to behave. A comparison is made between attributes exhibited by the installed program against the historical reputation attributes stored in the reputation database, some attributes may be weighted greater or less than others in the overall assessment, and a reasonable conclusion can be drawn whether the installed program is infected with malware or clean.

According to these teachings the device user, or the user of whatever device is running an operating system that supports installation of applications through a remote portal also known as an application store, grants or gives credentials to a "Security Agent" service running in the Internet that can connect on the user's behalf to an application store such as any or all of the examples noted above. The Security Agent service logs-in to the selected application store(s) and retrieves a list of applications which the user has acquired, whether those applications are free or paid. The Security Agent also retrieves a list of applications that are installed in the user's device(s). The Security Agent can obtain these lists and check for malware as is detailed below periodically, or as configured by the user (for example, once weekly or some other user-defined period, each time a new download/update is obtained from the application store, or only manually). The benefit of this approach is that it does not require a security software to be installed on the device itself, a step that may be restricted by the operating system, or the operating system limits the available methods for a such local security software to perform its tasks, or when it is more practical to not install a local security software even if the operating system would permit and grant necessary methods locally, but perform the operations in the cloud using the Security Agent running in the Internet as described herein.

Now having those two lists, in one embodiment the security agent derives a unique identifier for each of the applications on the list obtained from the virtual application store(s). For example, the security agent can run an algorithm that outputs the unique identifier from inputs of the application name, publisher, and version number. This is but one example and in other embodiments some combination of other information that is available at the application store can be used to derive the unique identifier.

There is a file reputation system in place that has reputation information about the applications tied to the unique identifiers. This is the reputation database noted above, and it is accessible by the Security Agent. As an example, F-SECURE Corporation of Helsinki, Finland maintains such a reputation database.

Figure 1:
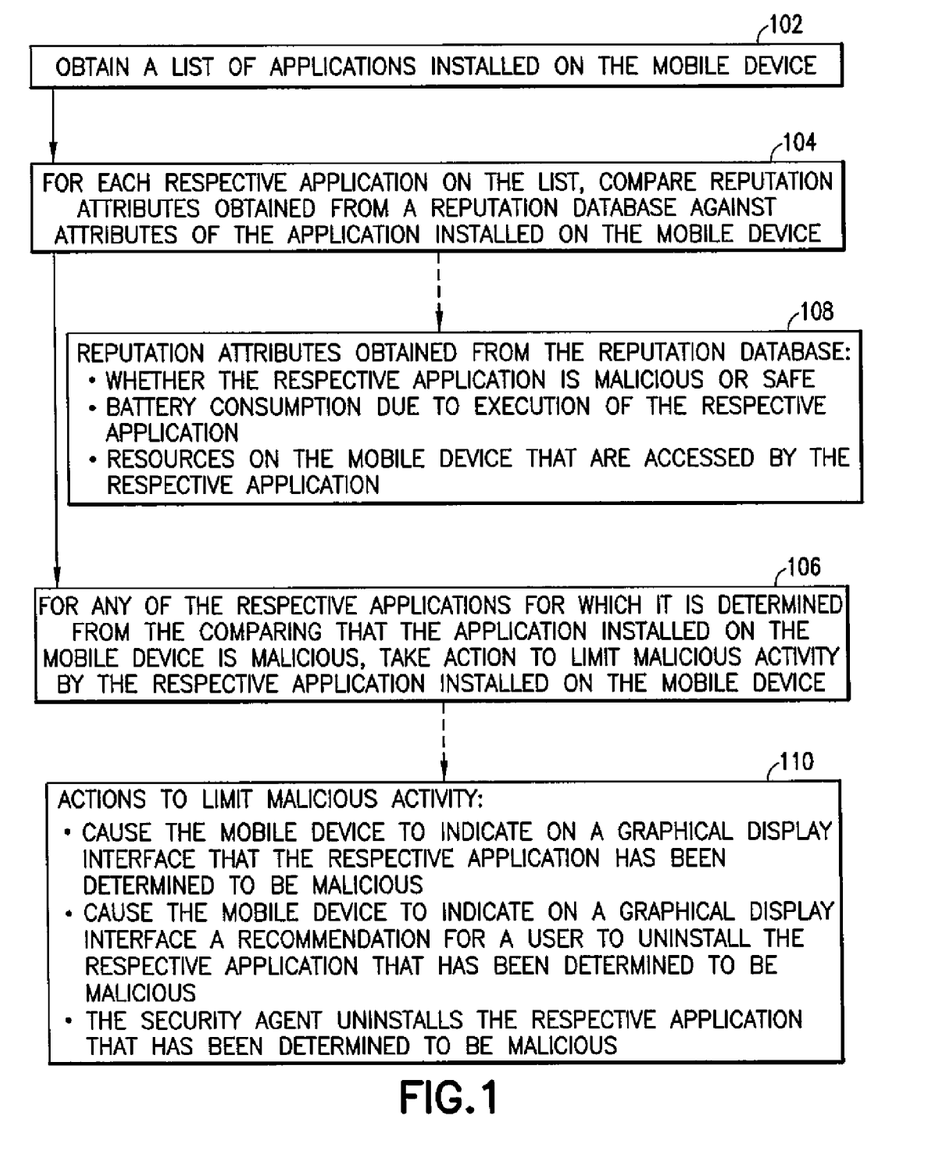
FIG. 1 is a schematic flow diagram illustrating from the perspective of a security agent or personal cloud security service operations performed on behalf of a device according to exemplary embodiments of these teachings.

FIG. 1 is a logical flow diagram that illustrates an exemplary but non-limiting embodiment of these teachings for implementing a security agent to operate on behalf of a device and describe from the perspective of that security agent. At block 102 the security agent obtains a list of applications installed on the device. As noted above, the security agent can obtain the list of applications installed on the device using security credentials provided by a user of the device; and can obtain that list from a virtual application store (or stores) from which the installed applications were downloaded to the device. Sometimes applications are also downloaded from virtual social networking sites and so the security agent can also use the user's security credentials to access that or those virtual social networking site or sites to check the user's download history for malware checking according to the teachings below.

Then at block 104, for each respective application on the list, the security agent compares reputation attributes obtained from a reputation database against attributes of the respective application installed on the device. In one non-limiting embodiment the security agent obtains the reputation attributes from the reputation database by deriving (for example, using the application name and version number or some other application-specific information as inputs) a unique identifier for each respective application on the list and submitting each of the derived unique identifiers to the reputation database. Block 108 details some non-limiting examples of such reputation attributes for the applications on the list that are obtained from the reputation database, such as whether the respective application is malicious or safe; battery consumption due to execution of the respective application; and resources on the device that are accessed by the respective application.

After the comparing of block 104, then block 106 summarizes that for any of the respective applications for which it is determined from the comparing that the application installed on the device is malicious, the security agent takes some action to limit malicious activity by the respective application installed on the device. Block 110 gives a few non-limiting examples of such actions: the security agent can cause the device to indicate on a graphical display interface that the respective application has been determined to be malicious; or in another embodiment the security agent can cause the device to indicate on a graphical display interface a recommendation for a user to uninstall the respective application that has been determined to be malicious; and in a still further embodiment the security agent can uninstall the respective application that has been determined to be malicious (for example, with permission from the application store which may come with the security credentials).

The Security Agent matches the user's application lists against the file reputation data. If it finds for example one or more applications that are malicious it can notify the user to take action, or if the application store permits, the security agent itself can automatically remove the application from the user device on the user's behalf. In one embodiment the security agent includes a security agent host that is resident on the server and a security agent client that is resident on the user's portable device. The security agent interacts with the user via the security agent client, which is a light local application installed on the smart phone or other portable device, and which only needs access to the security agent host. The security agent client is an application itself which in one embodiment displays if the smart phone/device is clean, or if actions have been taken on the users' behalf, or if action is required to be taken by the user. Optionally the local security agent client application can further display recommendations for the user (or for the user to authorize the security agent) to uninstall applications that are exhibiting suspicious behavior though not concluded to be malicious, such as for example applications which drain the user device's battery more than is typical for applications of similar type or more than most other installed applications of any type.

The specific elements of FIG. 1 and the specific non-limiting examples described above may be considered as steps of a method according to these teachings, of specific logical code of a set of computer executable instructions that are stored in or on a computer readable memory, or actions taken or functions executed by an apparatus that has one or more processors to execute such computer code stored on a memory. Such an apparatus can be a stand-alone security agent software program resident on a server operated by an anti-virus or other computer security company, or by a client security agent resident on the device in conjunction with a host security agent resident on the above server.

Above are described certain aspects of the invention. Following is a non-limiting example to better appreciate how these teachings can work in practice given the typical application store as lain out currently, specifically using screenshots from the GOOGLE PLAY application store at FIGS. 2A-E for this example.

We begin with the assumption that the security agent client is already installed on the user device. The security agent in general may be referred to as a personal cloud security service or PCSS, since it will be accessing the user's personal online data via the application store's download records for that user. Through this installed client and preferably when the client is first downloaded to the user's device, the user gives the personal cloud-security service ("PCSS") his/her credentials for social media and/or specific application store or stores. The social media and application store may be considered more broadly as monitored services. The user can alternatively grants access for the PCSS directly, for example using a single-sign-on application program interfaces (APIs) in the monitored services. An example of such a single-sign-on API is FACEBOOK's OAuthorization.

The security agent/PCSS can then login to the monitored services on the user's behalf. Once logged in the security agent/PCSS can perform actions either using the standard web-user interface (UI), or alternatively using the APIs, if the APIs provide necessary functionality. Of course the security agent/PCSS can use both login techniques for a single user if needed. Both may be considered as the security agent/PCSS using security credentials provided by the device user; in one the user gives its sign-in credentials to the security agent client directly, in the other (single sign-on API) the user does so indirectly by authorizing the security agent client/PCSS to use the API which has the users credentials already pre-stored from the user's earlier (manual) single-sign-on.

For this example assume the reputation database (sometimes termed a file reputation system FRS) used by the security agent/PCSS is maintained by the F-SECURE Corporation. This FRS has knowledge for all applications whether they are clean or malicious, and the F-SECURE Corporation makes this information available to the example PDSS via an API. For F-SECURE's existing FRS for applications this API is known as an object reputation service platform (ORSP).

Figure 2A:
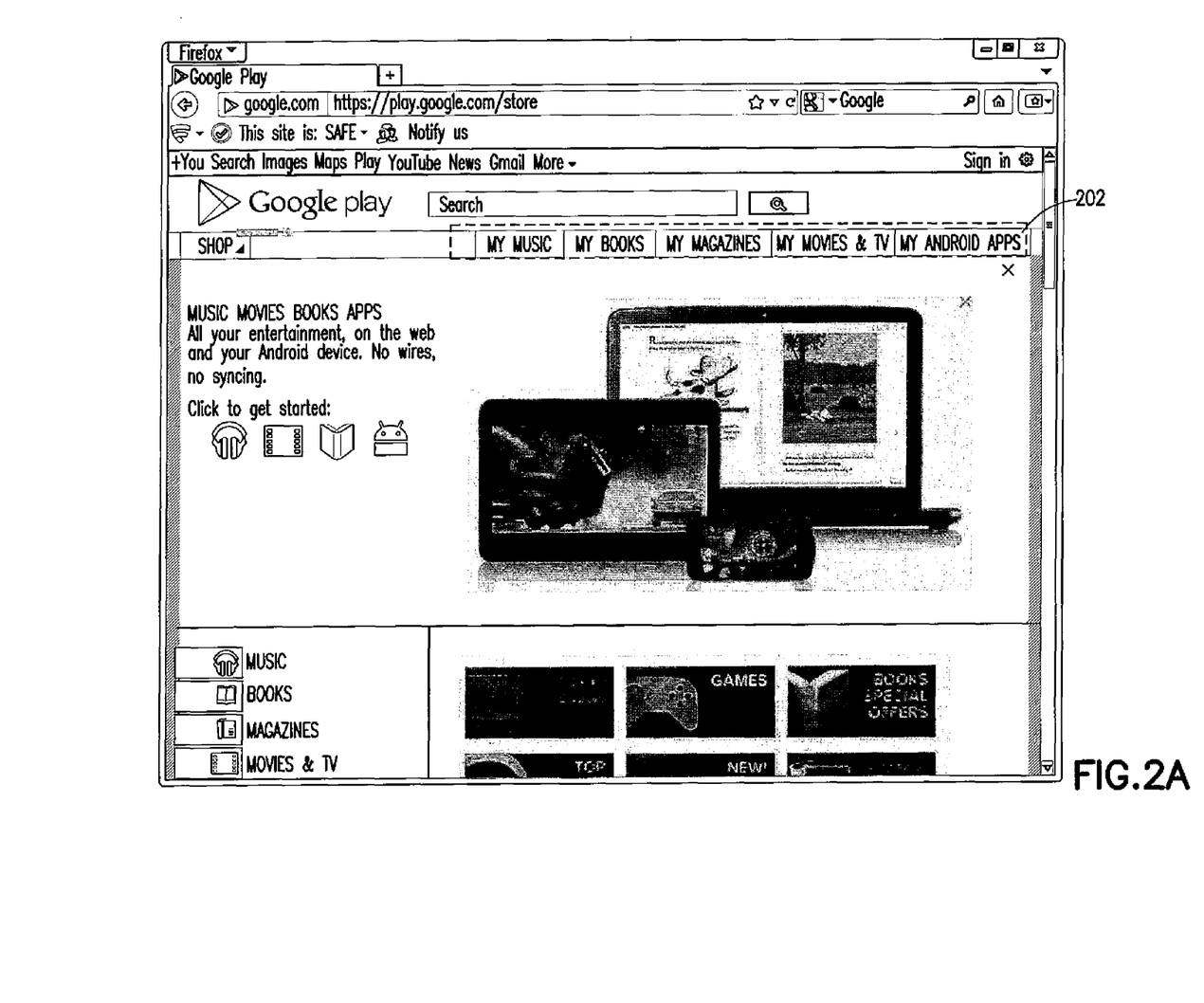
FIGS. 2A-E are screen shots of web pages through which a security agent performing a personal cloud security service navigates in order to obtain a list of applications downloaded by a user onto a device, and further to obtain details about each such application from a reputation database, in order to check for malware according to exemplary embodiments of these teachings.
Figure 2B:
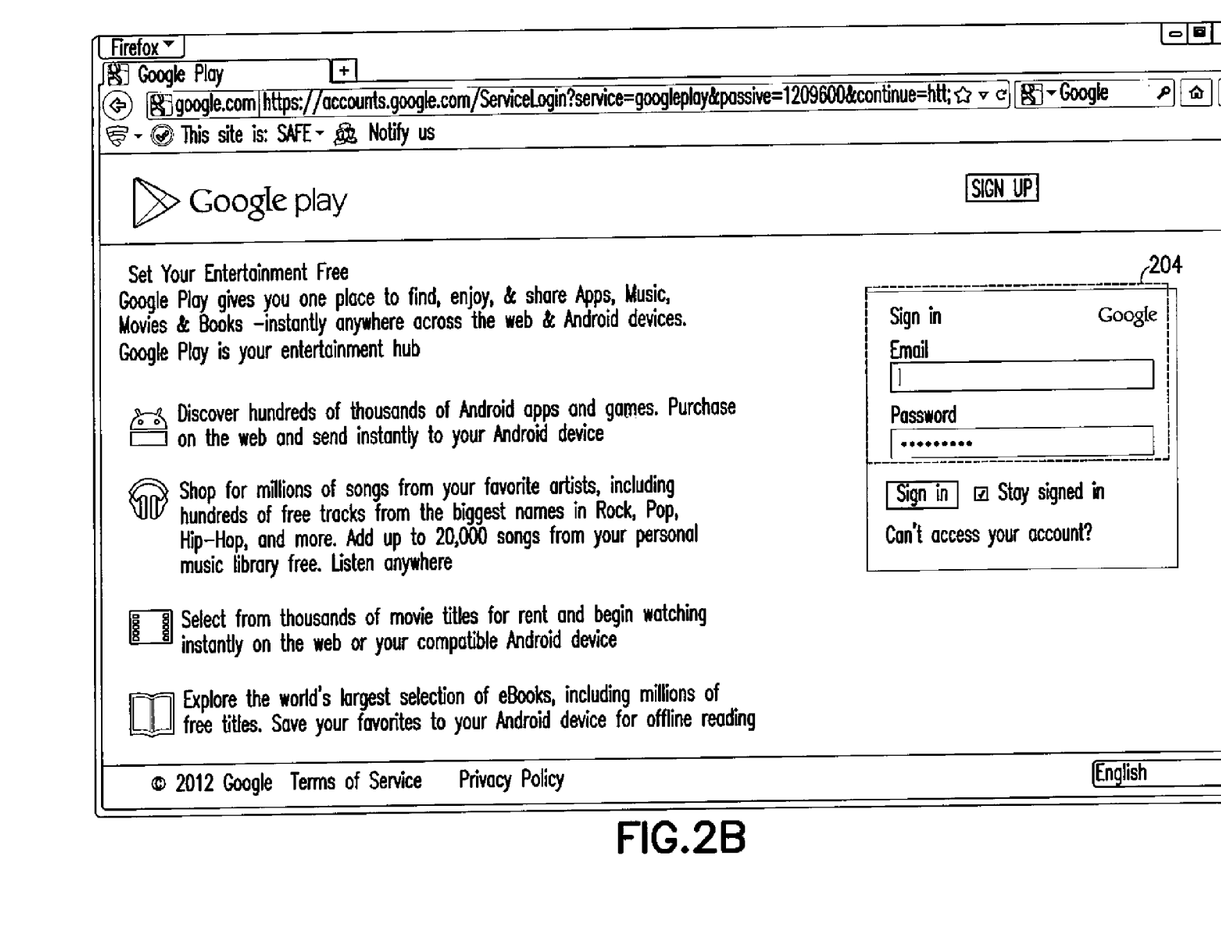
Figure 2C:
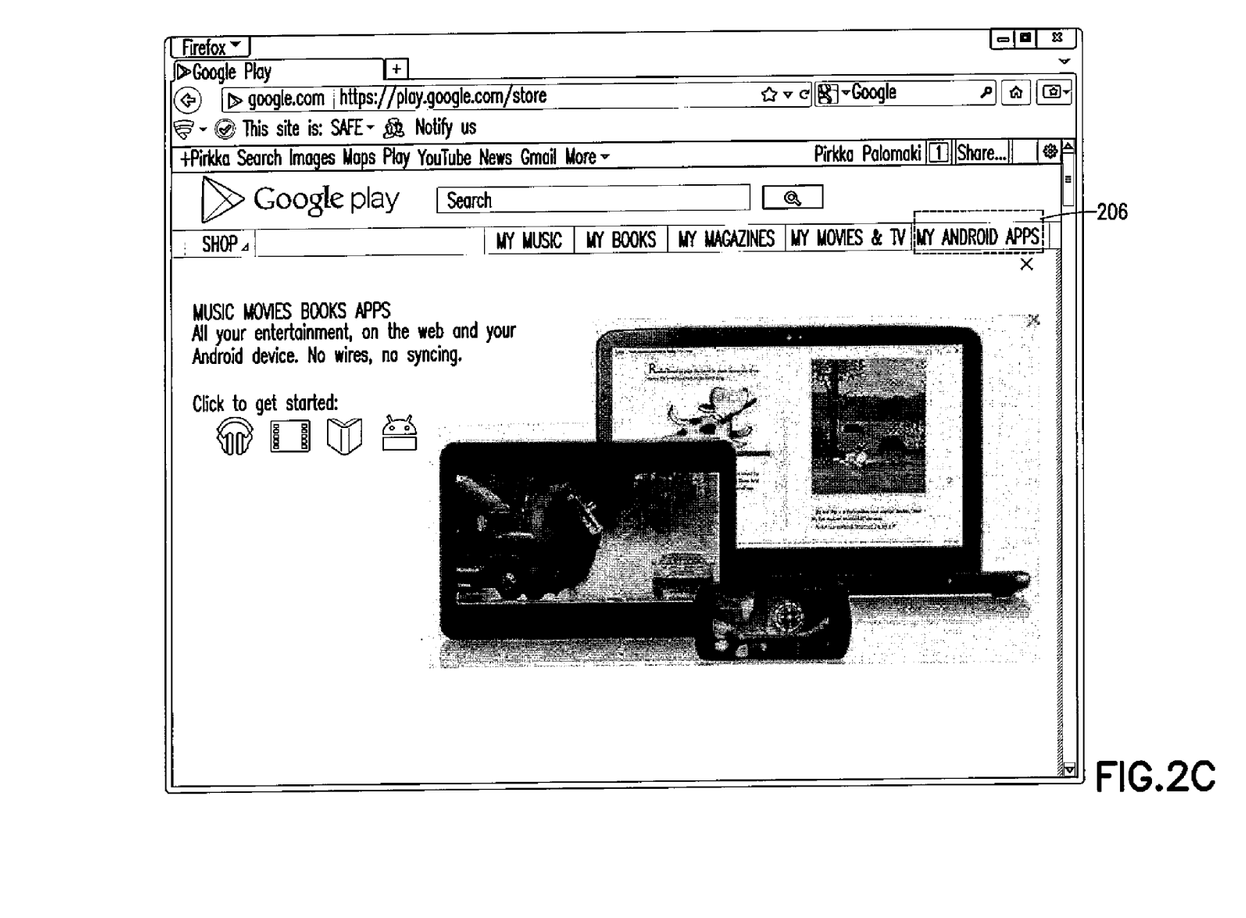

In the following example the security agent/PCSS is seen from the perspective of the GOOGLE PLAY application store as the end-user, and the user interaction is done through s regular Internet/web user interface (UI). As noted above the user has already entered his/her credentials to the security agent/PCSS. For example the security agent/PCSS can use the service-specific passwords which are provided by GOOGLE, or more trusting users can provide the security service/PCSS with their common User ID and password combination. The security agent/PCSS navigates to the application store's public portal, which in the FIG. 2A example is www/play.google.com, 'pretending' to be a regular browser, and follows the link there (any of the five links shown at reference number 202) which take the security agent/PCSS to the sign-in page shown at FIG. 2B. the security agent/PCSS enters the user's security credentials as shown at reference number 204 to gain access to the application store on behalf of the user as shown at FIG. 2C. The difference between FIGS. 2A and 2C is that the user is logged in at FIG. 2C, but other application stores may have a different screen displayed after login. However displayed, the home screen after login may be referred to as a private application store portal.

From the private application store portal of FIG. 2C the security agent/PCSS then navigates the list of downloaded applications, which necessarily are for this individual user device. Users with multiple devices may need to have different email accounts and sign-in credentials in order to keep different applications on the different devices, in which case the security service/PCSS can run through the same procedures described herein for each user account which corresponds to a different device for the same user. In this specific example the list of downloaded applications is found via the link 206 at FIG. 2C which takes the security agent/PCSS to the listing 208 at FIG. 2D from which it can retrieve the list of applications that are installed on each device. At this FIG. 2D screen the security service/PCSS can also perform actions such as uninstalling an application that it found to be infected with malware.

Figure 2D:
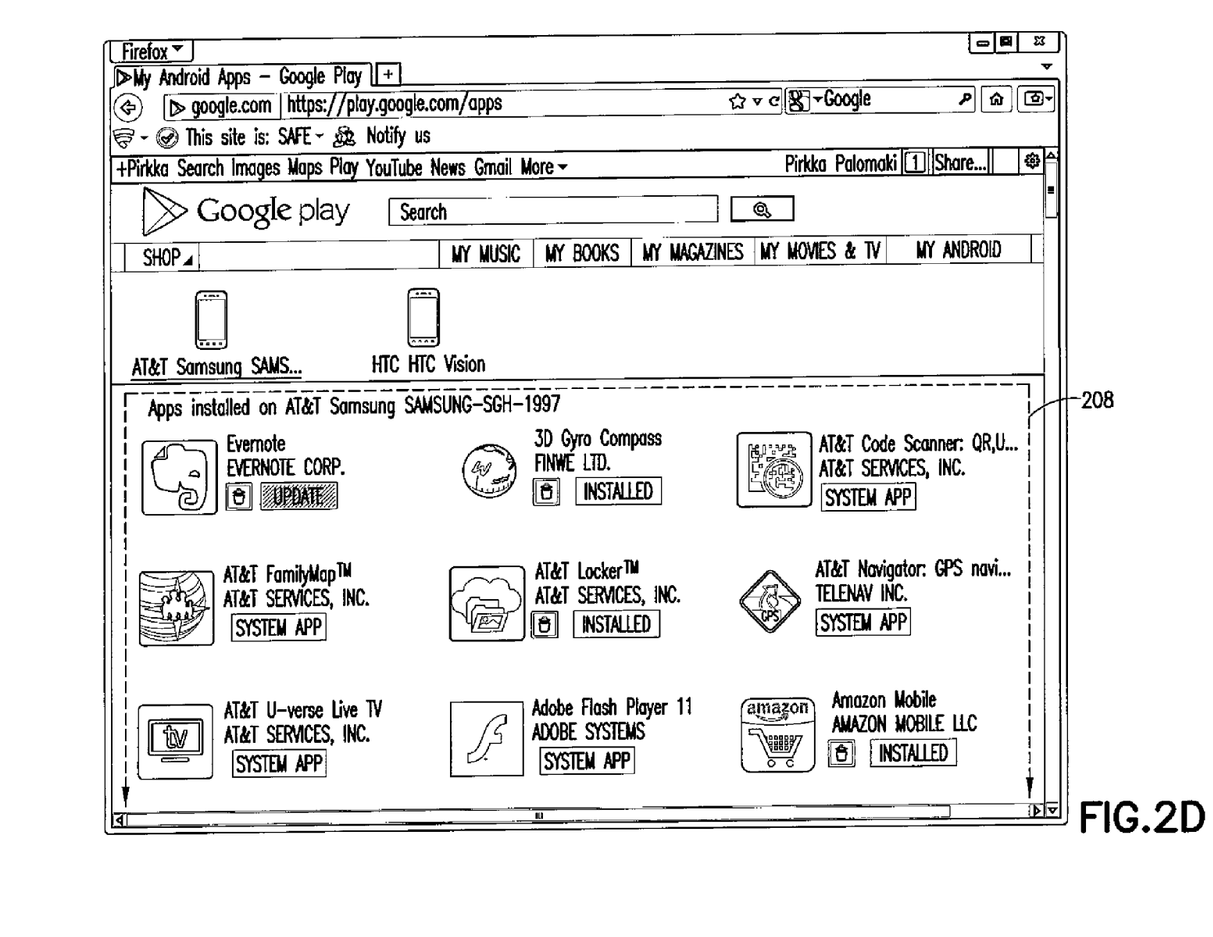
Figure 2E:
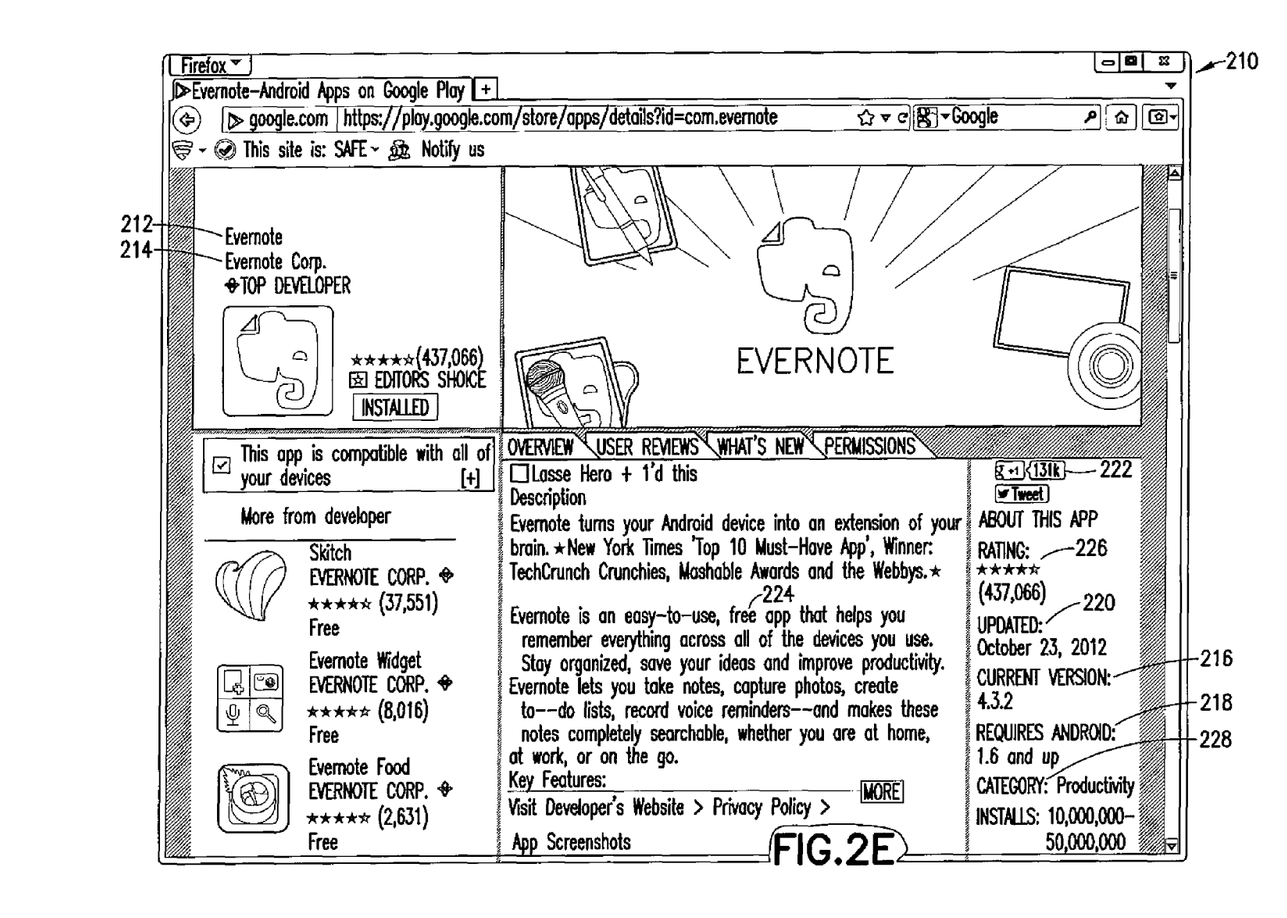

From the listing of installed applications 208 at FIG. 2D, the security service/PCSS can fetch further identifying details of each application. FIG. 2E illustrates such further identifying details 210 (application-specific information) for the first-listed application at the list 208, the EVERNOTE application, which in the listing 208 is a link to the FIG. 2E web page, which shows several types of application-specific information or identifying details for this application including: Application Name 212; Publisher Name 214; Version number 216; System requirements 218; Date updated 220; Size 222; Price 224; Content Rating 226; and Category 228. From any few of these more detailed pieces of different types of information, the security agent/PCSS can derive a unique identifier for that specific application and version, which is then used to access the file reputation system. For the F-SECURE FRS this unique identifier is termed a Unique App ID or UAID. The application-specific information will include information currently available and any future information available at later time. Only a subset of the available application-specific information is used to create F-SECURE's UAID, using for example a one-way hash function of the concatenated normalized string of the selected information (for example, SHA256[Application Name+Publisher Name+Version number]).

The F-SECURE Corporation in this example maintains downloaded copies of all available applications and has lab-automated responses to analyze each application. Each file is tagged with a corresponding UAID and stored with the results of the scan. This information is made available to subscribers or authorized users such as the security agent/PCSS through the ORSP/File Reputation Service. The security agent/PCSS can then compare the UAIDs of installed applications to those in the F-SECURE database to obtain the relevant clean/infected information that is available in the F-SECURE FRS, and possibly also other reputation attributes such as battery consumption and resources of the host device that the application accesses. If a malicious application is found, the security agent/PCSS can either notify the user to take action and/or automatically uninstall the application on the user's behalf, depending on the implementation and in certain implementations whether the user has given permission for the security agent/PCSS to unilaterally uninstall applications it concludes are infected.

If the monitored service provides an API to perform a similar function as the web UI login screen (FIG. 2B), the process from the perspective of the security agent client can be streamlined as far as the login process, but after sign-in the process flow for most providers (e.g., FACEBOOK and the APPSTORE) of monitored services should generally follow the procedures and flow detailed in the above non-limiting example.

FIG. 2 details a high level schematic diagram as a non-limiting example of the involved entities, in practice there are likely to be additional entities involved in communicating the relevant information but the FIG. 2 details the relevant ones having functions according to the examples detailed above. User electronic device 10 represents any portable user radio device such as for example a smartphone, tablet computer, laptop computer, wearable computer and the like, and includes at least one digital processor 10A; at least one computer readable memory 10B storing a set of computer executable programs or instructions 10C such as the downloaded applications, the security agent client which for example may be an API along with other APIs for signing-in to social networking sites and application stores; a radio with modem 10D for two way wireless communication with a radio access network (which is represented by the network access node 20); and a subscriber identity module (SIM) 10E which carries the device's unique international mobile subscriber information IMSI that the security agent/PCSS may use to positively and uniquely identify the device 10.

There is also shown at FIG. 2 a network access node 20 which also has its own at least one digital processor 20A, at least one computer readable memory 20B storing a set of computer executable programs or instructions 20C such as for signaling according to a radio standard (UTRAN, EUTRAN, WLAN and the like), and a radio with modem 20D for two way wireless communication with user devices such as the illustrated user device 10. As non-limiting examples, the network access node 20 may be a cellular base station (e.g., a NodeB or eNodeB for a UTRAN or EUTRAN cellular system) or an access point of a wireless local area network WLAN.

The security server 30 shown at FIG. 2 hosts the security agent host (if these teachings are implemented as a host/client arrangement) and performs the PCSS on behalf of the user for the specific user device 10. The security server 30 includes at least one digital processor 30A, at least one computer readable memory 30B storing a set of computer executable programs or instructions 30C, and a modem 30D for two way communications over the Internet. Communications between the user device 10 and the security server pass through the network access node 20 and other nodes of the operator's radio access network, and then typically through a core network for routing to the Internet and the security server 30. The security server further stores in its memory 30B the user credentials 30E that enable the PCSS to sign in on behalf of the user, and at 30F stores a decision algorithm for concluding whether a given application downloaded on the user device 10 is clean or infected based on the comparison against information fetched from the reputation database (DB) 50 as detailed above.

Figure 3:
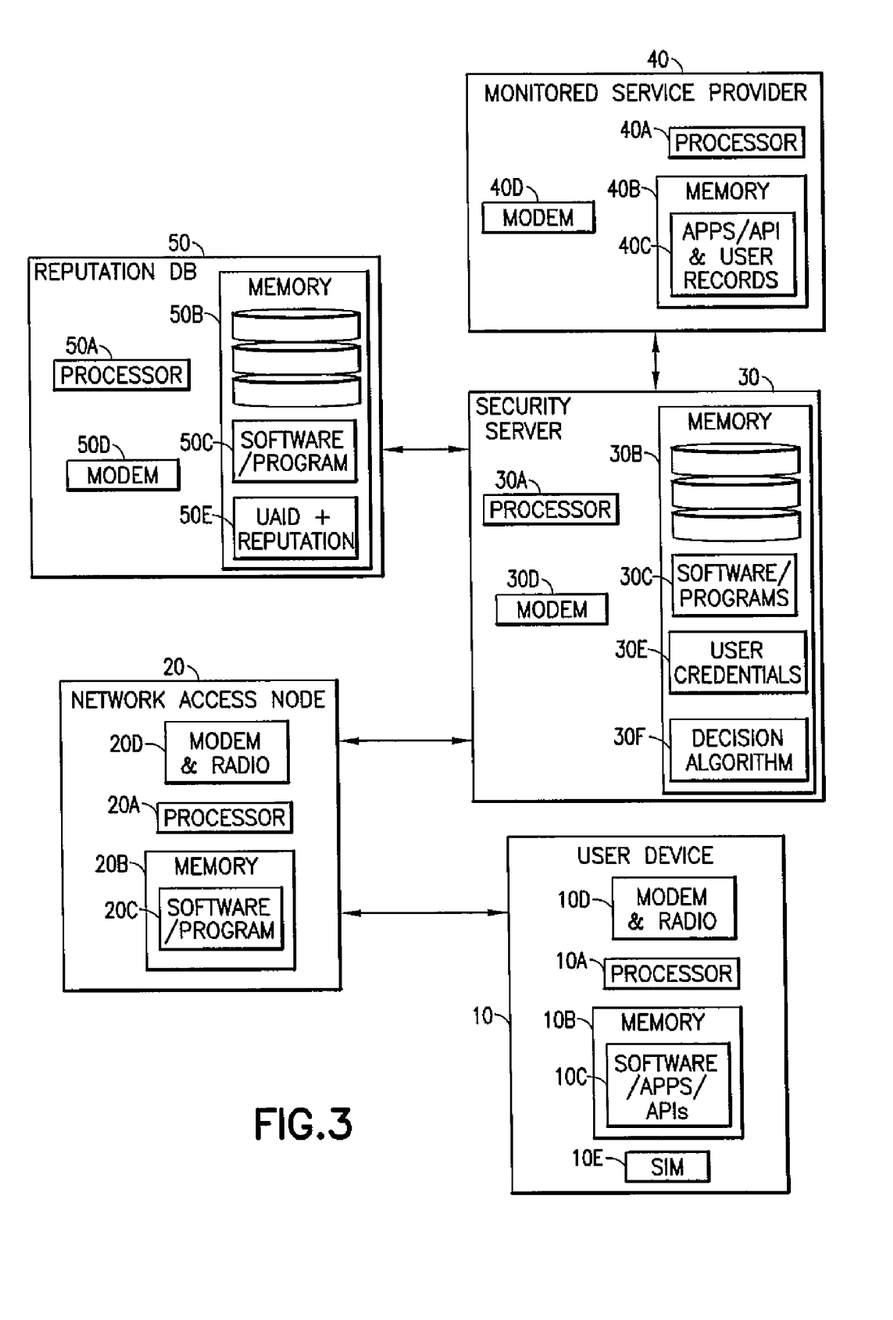
FIG. 3 is a schematic block diagram of certain exemplary electronic entities/nodes/devices which may be used for practicing embodiments of these teachings.

For completeness, FIG. 3 further illustrates an exemplary provider of monitored services 40 such as a server hosting the example GOOGLE PLAY application store described above with respect to FIGS. 2A-E, or hosting a social network site. This server also has at least one processor 40A, a computer readable memory 40B storing the applications which are for sale as well as the user records including the device-specific lists of what applications have been downloaded to that device 10 and the further detailed information shown by example at FIG. 2E. The provider's server 40 additionally has a modem 40D for communication with the security server 30 over the Internet, and for communication with the user device 10 via the core network and the network access node 20.

The reputation DB 50 also has a modem 50D to enable access by the security server 30 over the Internet. This reputation DB 50 further has at least one processor 50A, a memory 50B storing software comprising computer executable programs or instructions 50C including for example the reputation attributes associated with each UAID that positively identifies a given application and version.

It will be appreciated by the person of skill in the art that various modifications may be made to the above-described embodiments without departing from the scope of the invention. For example, the above description describes identifying the application in the DB 50 using a UAID to positively identify a given application and version in order to access the corresponding reputation information, but other implementations of the DB 50 can use some other secure identifier or no security at all for identifying a given application. Other such departures from the specific but non-limiting embodiments above may be practiced without departing from the inventive teachings herein.

I claim:

1. A method for implementing a security agent on behalf of a device, the method comprising:

obtaining, by a processor, a list of applications installed on the device from a repository remote from the security agent and device, wherein the repository is located on another device independent from the security agent and the device;

for each respective application on the list, comparing reputation attributes obtained from a reputation database against attributes of the application installed on the device; and for any of the respective applications for which it is determined from the comparing that the application installed on the device is malicious, taking action to limit malicious activity by the respective application installed on the device;

wherein the security agent is not installed on the device.

2. The method according to claim 1, wherein the security agent obtains the list of applications installed on the device using security credentials provided by a user of the device.

3. The method according to claim 2, wherein the security agent obtains the list of applications installed on the device from at least one of a virtual application store and a virtual social networking site from which the installed applications were downloaded to the device.

4. The method according to claim 1, wherein the reputation attributes for each respective application on the list that are obtained from the reputation database comprise at least:
whether the respective application is malicious or safe;
battery consumption due to execution of the respective application; and
resources on the device that are accessed by the respective application.

5. The method according to claim 4, wherein the reputation attributes are obtained from the reputation database by deriving a unique identifier for each respective application on the list and submitting each of the derived unique identifiers to the reputation database.

6. A non-transitory computer readable memory storing a set of executable instructions for implementing a security agent on behalf of a device, the set of executable instructions comprising:
code for obtaining, by a processor, a list of applications installed on the device from a repository remote from the security agent and the device, wherein the repository is located on another device independent from the security agent and the device;
code for comparing, for each respective application on the list, reputation attributes obtained from a reputation database against attributes of the application installed on the device; and
for any of the respective applications for which it is determined from executing the code for comparing that the application installed on the device is malicious, code for taking action to limit malicious activity by the respective application installed on the device.

7. The computer readable memory according to claim 6, wherein the code for obtaining operates to obtain the list of applications installed on the device using security credentials provided by a user of the device.

8. The computer readable memory according to claim 7, wherein the code for obtaining operates to obtain the list of applications installed on the device from at least one of a virtual application store and a virtual social networking site from which the installed applications were downloaded to the device.

9. The computer readable memory according to claim 6, wherein the reputation attributes for each respective application on the list that are obtained from the reputation database comprise at least:
whether the respective application is malicious or safe;
battery consumption due to execution of the respective application; and
resources on the device that are accessed by the respective application.

10. The computer readable memory according to claim 9, wherein the reputation attributes are obtained from the reputation database by deriving a unique identifier for each respective application on the list and submitting each of the derived unique identifiers to the reputation database.

11. At least one security server comprising at least one memory storing a set of computer executable instructions and at least one processor, wherein the memory with the set of computer executable instructions is configured with the at least one processor to cause the security server to at least:
obtain, by the processor, a list of applications installed on a device from a repository remote from the security server and the device, wherein the repository is located on another device independent from the security server and the device;
for each respective application on the list, compare reputation attributes obtained from a reputation database against attributes of the application installed on the device; and
for any of the respective applications for which it is determined from the comparing that the application installed on the device is malicious, take action to limit malicious activity by the respective application installed on the device.

12. The at least one security server according to claim 11, wherein the security agent obtains the list of applications installed on the device using security credentials provided by a user of the device.

13. The at least one security server according to claim 12, wherein the security agent obtains the list of applications installed on the device from at least one of a virtual application store and a virtual social networking site from which the installed applications were downloaded to the device.

14. The at least one security server according to claim 11, wherein the reputation attributes for each respective application on the list that are obtained from the reputation database comprise at least:
whether the respective application is malicious or safe;
battery consumption due to execution of the respective application; and
resources on the device that are accessed by the respective application.

15. The at least one security server according to claim 14, wherein the reputation attributes are obtained from the reputation database by deriving a unique identifier for each respective application on the list and submitting each of the derived unique identifiers to the reputation database.

16. The security server according to claim 11, wherein the set of computer executable instructions operate in conjunction with a security agent client application resident on the device to implement a personal cloud security service on behalf of the device using security credentials provided by a user of the device.

* * * * *